United States Patent
Kang et al.

(10) Patent No.: US 8,548,092 B2
(45) Date of Patent: Oct. 1, 2013

(54) METHOD AND APPARATUS FOR REDUCING PEAK TO AVERAGE POWER RATIO USING PEAK WINDOWING

(75) Inventors: In-Tae Kang, Seongnam-si (KR);
Jung-Hwa Bae, Suwon-si (KR);
Jung-Uk Woo, Hwaseong-si (KR);
Shin-Ho Kim, Suwon-si (KR);
Sang-Min Bae, Yongin-si (KR);
Jong-Han Lim, Seoul (KR); Dong-Min Kim, Anyang-si (KR); Bo-Rham Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 250 days.

(21) Appl. No.: 13/004,271

(22) Filed: Jan. 11, 2011

(65) Prior Publication Data

US 2011/0182339 A1    Jul. 28, 2011

(30) Foreign Application Priority Data

Jan. 25, 2010  (KR) .................... 10-2010-0006591

(51) Int. Cl.
*H04K 1/02*  (2006.01)

(52) U.S. Cl.
USPC .......................... 375/296; 375/295

(58) Field of Classification Search
USPC ........................................ 375/296
See application file for complete search history.

(56) References Cited

U.S. PATENT DOCUMENTS

| | | | | |
|---|---|---|---|---|
| 5,287,387 A | * | 2/1994 | Birchler ................ | 375/296 |
| 5,638,403 A | * | 6/1997 | Birchler et al. ......... | 375/296 |
| 6,198,778 B1 | * | 3/2001 | Mestdagh ............... | 375/296 |
| 6,356,606 B1 | * | 3/2002 | Hahm .................... | 375/350 |
| 6,362,701 B1 | * | 3/2002 | Brombaugh et al. ..... | 332/103 |
| 6,463,450 B1 | * | 10/2002 | Balachandran et al. ... | 708/300 |
| 7,013,161 B2 | * | 3/2006 | Morris .................. | 455/522 |
| 7,386,060 B2 | * | 6/2008 | Jaenecke et al. ......... | 375/296 |
| 7,643,801 B2 | * | 1/2010 | Piirainen ............... | 455/114.2 |

(Continued)

FOREIGN PATENT DOCUMENTS

| EP | 2 141 874 A1 | 1/2010 |
|---|---|---|
| WO | 2004/039024 A1 | 5/2004 |

OTHER PUBLICATIONS

Chen Wei et al., "A New Method for Reduction of PAPR Using Cordic Algorithm in WiMAX System", 2006 International Conference on Communications, Jun. 2006, pp. 1193-1196, China.

*Primary Examiner* — Chieh M Fan
*Assistant Examiner* — Santiago Garcia
(74) *Attorney, Agent, or Firm* — Jefferson IP Law, LLP

(57) ABSTRACT

A method and apparatus for reducing a Peak to Average Power Ratio (PAPR) using peak windowing is provided. In the apparatus, an absolute value calculator calculates an absolute value of an input signal, a subtractor subtracts a predetermined clipping threshold level from the absolute value, a smoothing unit performs smoothing on the subtracted signal according to a predetermined smoothing scheme and outputs a first smoothed signal, an adder adds the first smoothed signal to the clipping threshold level, an inverse calculator outputs a second smoothed signal by multiplying the clipping threshold level by an inverse of the added signal, and a multiplier outputs a final PAPR-reduced signal by multiplying the input signal by the second smoothed signal. The method and apparatus address an overcompensation problem while processing signals having a large bandwidth and a high data rate without delay, thereby minimizing the clipping influences on Bit Error Rate (BER) and Adjacent Channel Leakage Ratio (ACLR) performances.

10 Claims, 14 Drawing Sheets

(56) References Cited

U.S. PATENT DOCUMENTS

| | | | |
|---|---|---|---|
| 7,839,949 B2* | 11/2010 | Hamada et al. | 375/296 |
| 8,102,941 B2* | 1/2012 | Hamada et al. | 375/297 |
| 8,130,866 B2* | 3/2012 | Nagatani et al. | 375/297 |
| 8,238,473 B2* | 8/2012 | Morris et al. | 375/296 |
| 8,259,846 B2* | 9/2012 | Liang et al. | 375/296 |
| 8,265,196 B2* | 9/2012 | Gandhi | 375/296 |
| 2002/0181610 A1* | 12/2002 | Sumasu et al. | 375/296 |
| 2003/0072361 A1* | 4/2003 | Simeoni | 375/224 |
| 2004/0203430 A1* | 10/2004 | Morris | 455/67.11 |
| 2004/0252725 A1* | 12/2004 | Sun et al. | 370/503 |
| 2005/0232373 A1* | 10/2005 | Peeters | 375/296 |
| 2006/0247898 A1* | 11/2006 | Cha | 702/188 |
| 2007/0140376 A1* | 6/2007 | Kang | 375/296 |
| 2009/0232249 A1* | 9/2009 | Hamano | 375/295 |
| 2009/0245397 A1* | 10/2009 | Moffatt et al. | 375/260 |
| 2009/0245414 A1* | 10/2009 | Okada et al. | 375/295 |
| 2010/0004790 A1* | 1/2010 | Harbin et al. | 700/291 |
| 2010/0061224 A1* | 3/2010 | Noh et al. | 370/210 |
| 2011/0228872 A1* | 9/2011 | Soler Garrido | 375/295 |

* cited by examiner

METHOD AND APPARATUS FOR REDUCING PEAK TO AVERAGE POWER RATIO USING PEAK WINDOWING

PRIORITY

This application claims the benefit under 35 U.S.C. §119(a) of a Korean patent application filed in the Korean Intellectual Property Office on Jan. 25, 2010 and assigned Serial No. 10-2010-0006591, the entire disclosure of which is hereby incorporated by reference.

BACKGROUND OF THE INVENTION

1. Field of the Invention

The present invention relates generally to a power amplifier (PA) or the corresponding baseband modem design to efficiently utilize PA. More particularly, the present invention relates to a method and apparatus for reducing a Peak to Average Power Ratio (PAPR) to achieve linearization of a power amplifier.

2. Description of the Related Art

With the increasing demand not only for voice calls but also for mass data services such as various multimedia Internet services in wireless communication markets, Orthogonal Frequency Division Multiplexing (OFDM), Single Carrier Frequency Division Multiplexing (SC-FDMA), and Wideband Code Division Multiple Access (WCDMA) are attracting attention as wireless transmission technologies capable of meeting the demand. These technologies are applied to standards such as the Institute for Electrical and Electronics Engineers (IEEE) 802.16e Wireless Broadband (WiBro) or Mobile Worldwide Interoperability for Microwave Access (Mobile WiMAX) standard, the Wireless Local Area Network (Wireless LAN) standard, and the 3rd Generation Partnership Project (3GPP) Long Term Evolution (LTE) standard.

OFDM is a kind of Multi Carrier Modulation (MCM) that transmits signal information by means of each subcarrier in the frequency domain. Therefore, the signal being actually transmitted is a signal in the time domain, which has undergone Inverse Fast Fourier Transform (IFFT) on a symbol-by-symbol basis. Since a summation of many frequency components incurs high variability in amplitude, a signal having undergone IFFT has a characteristic that its signal strength is not maintained constantly. Because of this, OFDM results in a high Peak to Average Power Ratio (PAPR) at the power amplifier used for transmission, compared with other modulation schemes, thus causing a failure to use the power amplifier efficiently.

A high-PAPR input signal may deviate from a linear operating range of a power amplifier, causing distortion at an output stage of the power amplifier. In this case, to obtain the maximum output, a back-off scheme may be used, which lowers power of an input signal so as to allow the power amplifier to operate in its linear operating range. However, this back-off scheme increases power consumption as a back-off value for lowering power of an input signal increases, worsening efficiency of the power amplifier. This high-PAPR signal reduces power efficiency or requires a high-end power amplifier, undesirably increasing the hardware prices.

Therefore, a mobile communication system using MCM such as OFDM and OFDMA, requires a technology for efficiently reducing a PAPR, which occurs when a plurality of signals are mixed. Methods for reducing a PAPR may include clipping, block coding, phase adjusting, etc. The clipping technique, a typical technique for reducing a PAPR, maintains the phase of a time-domain signal having undergone IFFT and limits only the amplitude thereof below a desired threshold level. However, the clipping technique causes nonlinear distortion because it cuts off an input signal at a predetermined threshold level, and to compensate for this nonlinear distortion, this technique requires additional processing such as filtering. However, the filtering generates a peak regrowth that the signal component cut off by clipping re-grows, increasing again the PAPR disadvantageously.

Accordingly, there is a need for a more efficient technology for reducing a PAPR of an input signal for a power amplifier in a communication system such as OFDM.

SUMMARY OF THE INVENTION

An aspect of the present invention is to address at least the above-mentioned problems and/or disadvantages and to provide at least the advantages described below. Accordingly, an aspect of the present invention is to provide a method and apparatus for reducing a Peak to Average Power Ratio (PAPR) to achieve linearization of a power amplifier.

Another aspect of the present invention is to provide a method and apparatus for applying peak windowing after clipping to reduce a PAPR of an Orthogonal Frequency Division Multiplexing (OFDM) signal.

Further another aspect of the present invention is to provide a method and apparatus for smoothing a clipping window when applying peak windowing after clipping.

Further another aspect of the present invention is that a functional block constituting the smoothing a clipping window provides a general method and apparatus to produce bandwidth reduced envelope of a signal. These scheme can be utilized in other disciplines where bandwidth reduced envelope is utilized. For instance, the present invention can be utilized in Envelope Tracking (ET) technique to reduce the power consumption in a PA.

In accordance with an aspect of the present invention, a method for reducing a PAPR using peak windowing is provided. The method includes calculating an absolute value of an input signal, subtracting a predetermined clipping threshold level from the absolute value, outputting a first smoothed signal by performing smoothing on the subtracted signal according to a predetermined smoothing scheme, adding the first smoothed signal to the clipping threshold level, outputting a second smoothed signal by multiplying the clipping threshold level by an inverse of the added signal, and outputting a final PAPR-reduced signal by multiplying the input signal by the second smoothed signal.

In accordance with another aspect of the present invention, an apparatus for reducing a PAPR using peak windowing is provided. The apparatus includes an absolute value calculator for calculating an absolute value of an input signal, a subtractor for subtracting a predetermined clipping threshold level from the absolute value, a smoothing unit for performing smoothing the subtracted signal according to a predetermined smoothing scheme and for outputting a first smoothed signal, an adder for adding the first smoothed signal to the clipping threshold level, an inverse calculator for outputting a second smoothed signal by multiplying the clipping threshold level by an inverse of the added signal, and a multiplier for outputting a final PAPR-reduced signal by multiplying the input signal by the second smoothed signal.

In accordance with yet another aspect of the present invention, a smoothing method for reducing a PAPR is provided. The smoothing method includes multiplying multiple delayed samples constituting a smoothing input signal by window coefficients individually, generating a windowed envelope signal by selecting maximum values at every sampling time from the signals multiplied by the window coefficients, and performing Low-Pass Filtering (LPF) on the windowed envelope signal.

In accordance with another aspect of the present invention, a smoothing apparatus for reducing a PAPR is provided. The smoothing apparatus includes a plurality of cascaded delays for receiving samples constituting a smoothing input signal, multipliers for multiplying outputs of the delays by window coefficients individually, a maximum operator for generating a windowed envelope signal by selecting maximum values at every sampling time from the signals multiplied by the window coefficients, and a low-pass filter for performing LPF on the windowed envelope signal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The below-described exemplary embodiment of the present invention is directed to a peak windowing technique for reducing a Peak to Average Power Ratio (PAPR) of a high-PAPR signal such as an Orthogonal Frequency Division Multiplexing (OFDM) signal and Wideband Code Division Multiple Access (WCDMA) signal.

Figure 1A:
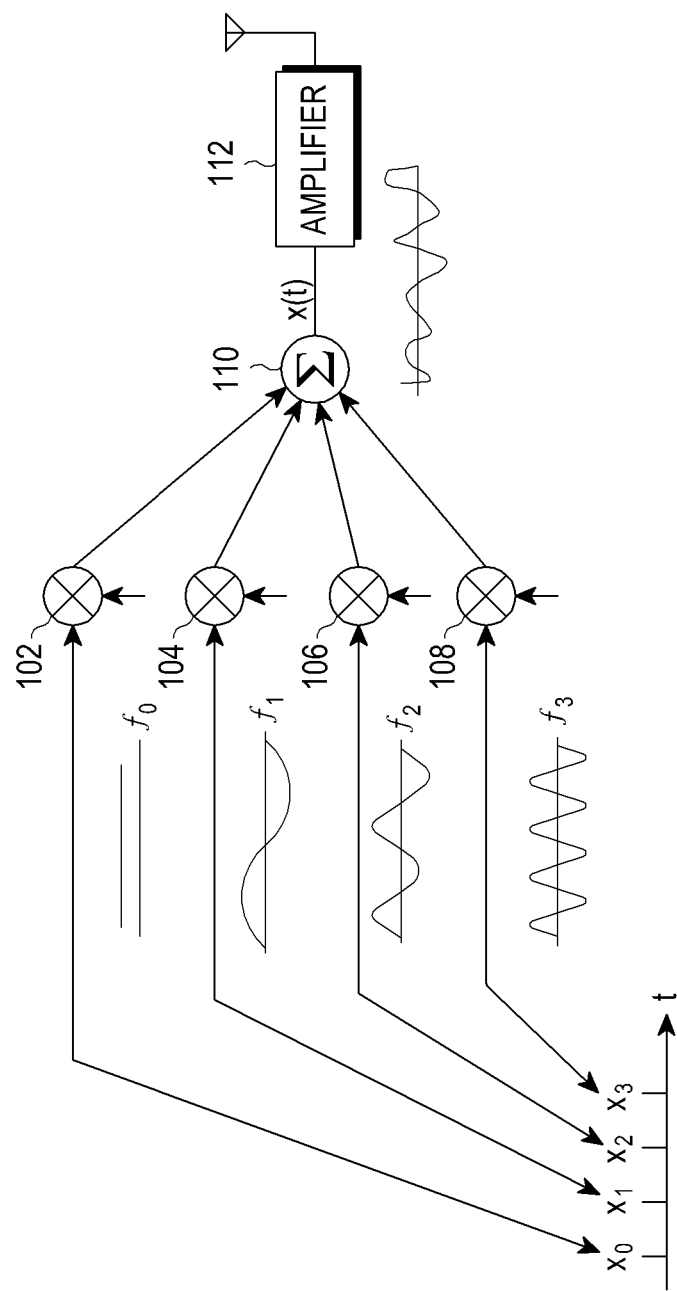
FIGS. 1A, 1B and 1C are diagrams illustrating occurrence of a Peak to Average Power Ratio (PAPR) in an Orthogonal Frequency Division Multiplexing (OFDM) system according to an exemplary embodiment of the present invention.
Figure 1B:
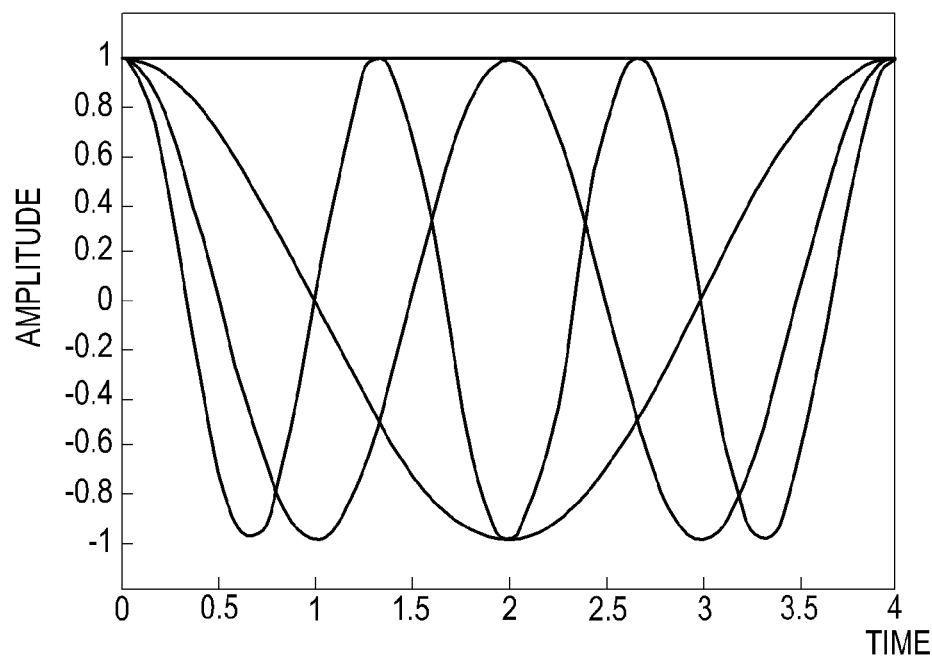
Figure 1C:
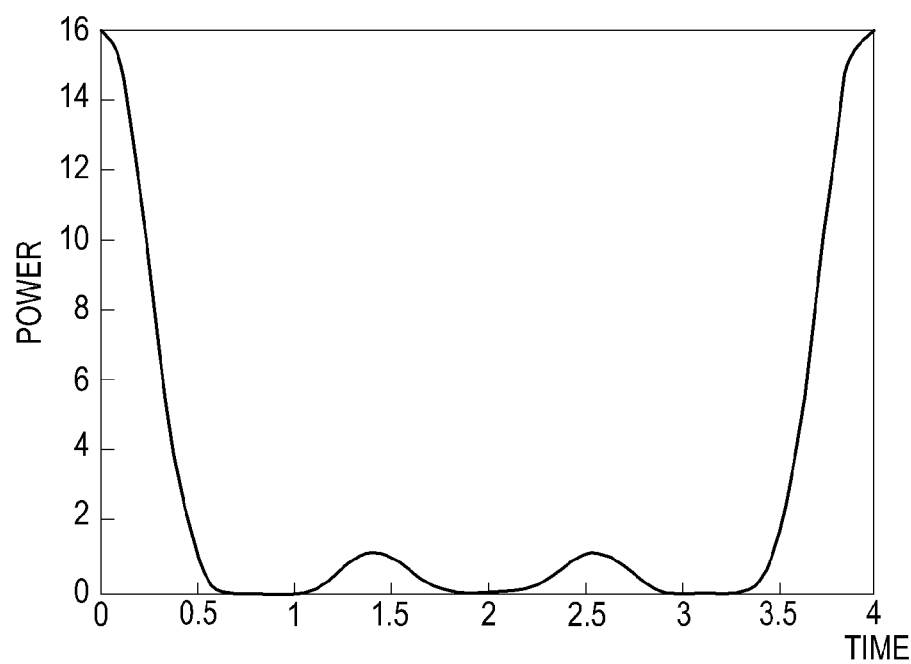

FIGS. 1A, 1B and 1C are diagrams illustrating occurrence of a PAPR in an OFDM system according to an exemplary embodiment of the present invention.

Referring to FIG. 1A, symbols $x_0$, $x_1$, $x_2$, and $x_3$ to be transmitted are modulated with different subcarriers $f_0$, $f_1$, $f_2$, and $f_3$ by OFDM modulators 102, 104, 106, and 108, respectively. An adder 110 generates a summed signal x(t) by summing the modulated signals. The summed signal is amplified by an amplifier 112 and then transmitted via an antenna.

FIG. 1B illustrates waveforms of subcarrier signals being input to the OFDM modulators 102 to 108, and FIG. 1C illustrates a waveform of a signal that is output from the adder 110 after undergoing OFDM modulation. It can be understood that signals before undergoing OFDM modulation are maintained constantly in amplitude over time as illustrated in FIG. 1B, whereas a signal after undergoing OFDM modulation is significantly changed in power as illustrated in FIG. 1C. In other words, a signal after undergoing OFDM modulation is very high in PAPR.

Figure 2:
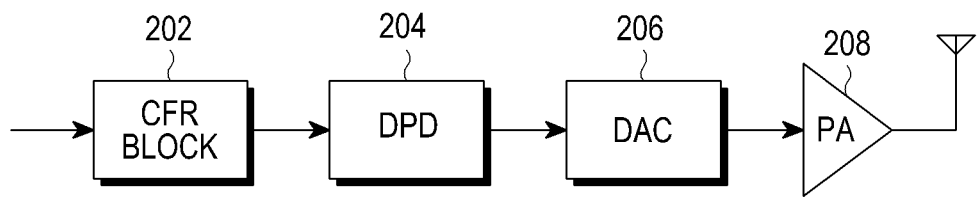
FIG. 2 is a block diagram illustrating a structure of an amplifier in an OFDM system with a structure for reducing a PAPR according to an exemplary embodiment of the present invention.

FIG. 2 is a block diagram illustrating a structure of an amplifier in an OFDM system with a structure for reducing a PAPR according to an exemplary embodiment of the present invention.

Referring to FIG. 2, an input signal is input to a Crest Factor Reduction (CFR) block 202, the input signal including an In-phase (I) signal component and a Quadrature-phase (Q) signal component which have been encoded and modulated according to the standard used in the system. The CFR block 202 adequately performs clipping on the input signal according to a required clipping threshold level. To avoid interference with signals on adjacent channels and improve Error Vector Magnitude (EVM) of the input signal by suppressing an Inter-Modulation Distortion (IMD) signal, which is a combination of harmonic signals generated during power amplification, a Digital Pre-Distortion (DPD) block 204 adds pre-distortion signals to the clipped signal output from the CFR block 202.

An output signal of the DPD 204 is converted into an analog signal by a Digital to Analog Converter (DAC) 206, and a power amplifier (PA) 208 amplifies the power of the analog signal to a required level, and transmits the power-amplified signal via an antenna.

Figure 3:
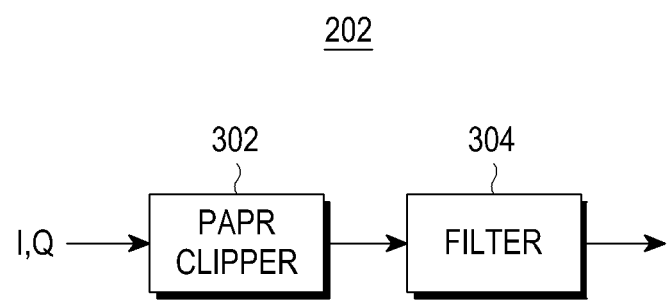
FIG. 3 is a block diagram illustrating a Crest Factor Reduction (CFR) block according to an exemplary embodiment of the present invention.

FIG. 3 is a block diagram illustrating a CFR block according to an exemplary embodiment of the present invention.

Referring to FIG. 3, a PAPR clipper 302 calculates a power level of each sample of an input I/Q signal, compares the calculated power level of each sample with a required clipping threshold level, and cuts samples whose power levels are higher than the clipping threshold level, to the clipping threshold level, thereby generating a clipped signal consisting of the clipped signal samples.

By simply cutting an input signal whose power level is higher than or equal to a specific clipping threshold level as described above, the PAPR clipper 302 may cause nonlinear distortion to occur in the input signal. To reduce the nonlinear distortion due to the clipping by the PAPR clipper 302, a filter 304 performs filtering on the clipped signal thereby making sharp edges of the clipped signal smooth.

If a clipping threshold level for an input signal x(n) to be transmitted is represented by A, a signal y(n) after undergoing clipping is defined as Equation (1) below, with further definition by Equation (2).

$$y(n) = c(n)x(n) \quad (1)$$

$$c(n) = \begin{cases} 1 & \text{if } |x(n)| \le A \\ \frac{A}{|x(n)|} & \text{if } |x(n)| > A \end{cases}$$

where c(n) is a clipping function representing a clipping window.

$$CR = 20\log\left(\frac{A}{\sigma}\right) \text{ [dB]} \quad (2)$$

$$\sigma = \sqrt{E[|x(n)|^2]}$$

where Clipping Ratio (CR) denotes a clipping ratio, and σ denotes a Root Mean Square (RMS) power of an input signal x(n).

Figure 4:
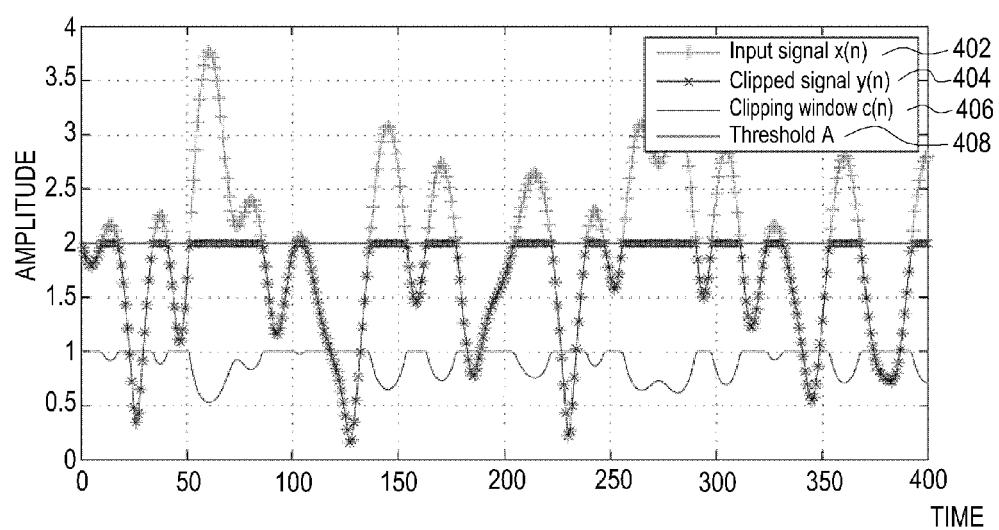
FIG. 4 is a diagram illustrating a clipped signal of an input signal, compared with the input signal in the time domain according to the related art.

FIG. 4 is a diagram illustrating a clipped signal of an input signal, compared with the input signal in the time domain according to the related art.

Referring to FIG. 4, an input signal x(n) 402 is sharply clipped at a clipping threshold level A 408 by being multiplied by a clipping window c(n) 406. As a result, a clipped signal y(n) 404 includes the portions that show sudden changes in the time domain.

Using this clipping method, portions of an input signal having power levels exceeding a threshold level are cut. However, this causes sharp edges leading to sudden changes of the input signal, and thus generating a high frequency. The generation of a high frequency causes significant in-band distortion and out-of-band radiation. Generally, in-band distortion is difficult to control, but out-of-band radiation may be reduced by peak windowing filtering.

To reduce out-of-band radiation, a Clipping and Filtering (CNF) technique in FIG. 3 uses a band-pass filter or a low-pass filter. However, if a clipped signal passes through the filter, a peak regrowth phenomenon occurs, in which the components cut by the clipping re-grow. As a result, a PAPR of the signal increases again.

Figure 5A:
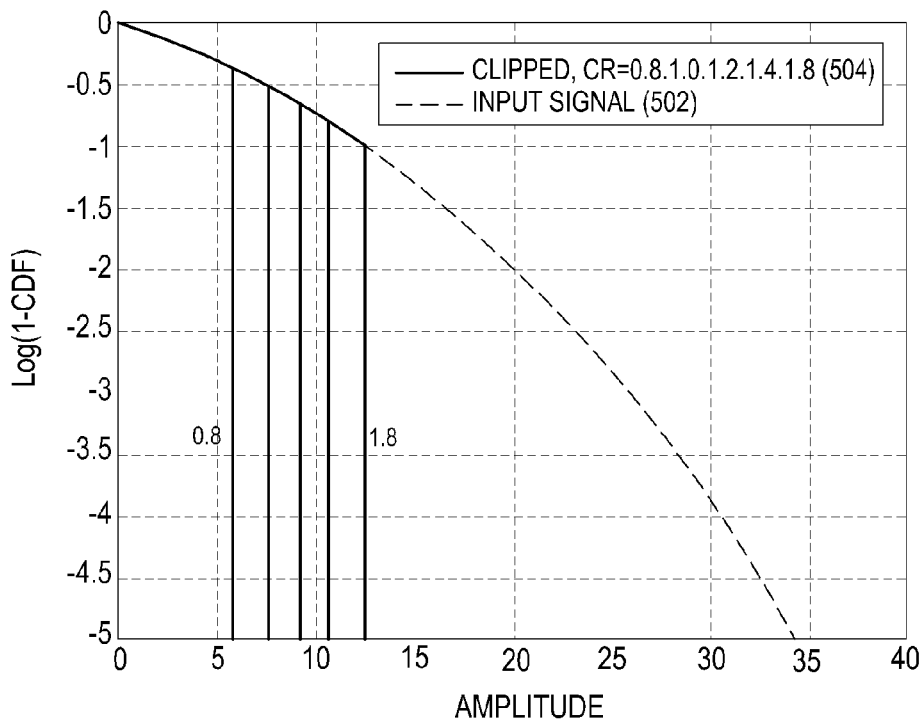
FIGS. 5A and 5B are diagrams illustrating peak regrowths caused by Clipping and Filtering (CNF) according to the related art.
Figure 5B:
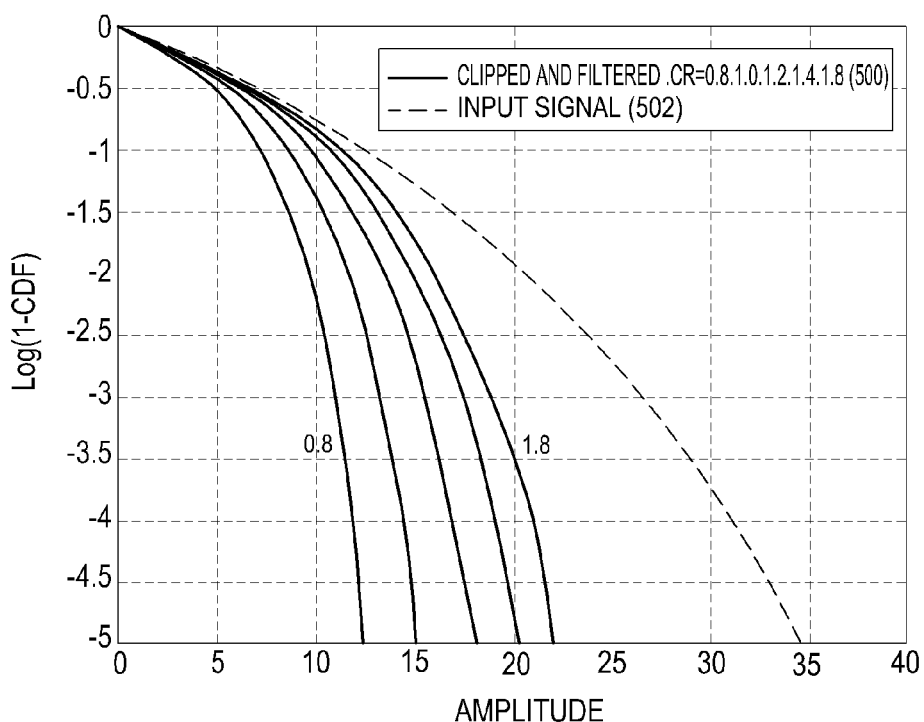

FIGS. 5A and 5B are diagrams illustrating peak regrowths caused by CNF according to the related art.

Referring to FIG. 5A, clipped signals 504 are illustrated for an input signal 502 in the form of Log (1−CDF), for CR=0.8, 1.0, 1.2, 1.4, and 1.8. Referring to FIG. 5B, signals 500 are illustrated after undergoing filtering. Here, CDF denotes a Cumulative Density Function. As illustrated, it can be understood that the clipped signals 504 have shapes obtained by sharply cutting the unclipped input signal 502, and the signals 500 after undergoing filtering have increased in amplitude compared with the clipped signals 504, instead of their high-frequency components being removed and smoothed.

The peak regrowths caused by CNF may be reduced by re-applying CNF. This scheme is called Repeated Clipping and Filtering (RCF). That is, if CNF is repeated several times, a PAPR approaches the clipping level.

Figure 6:
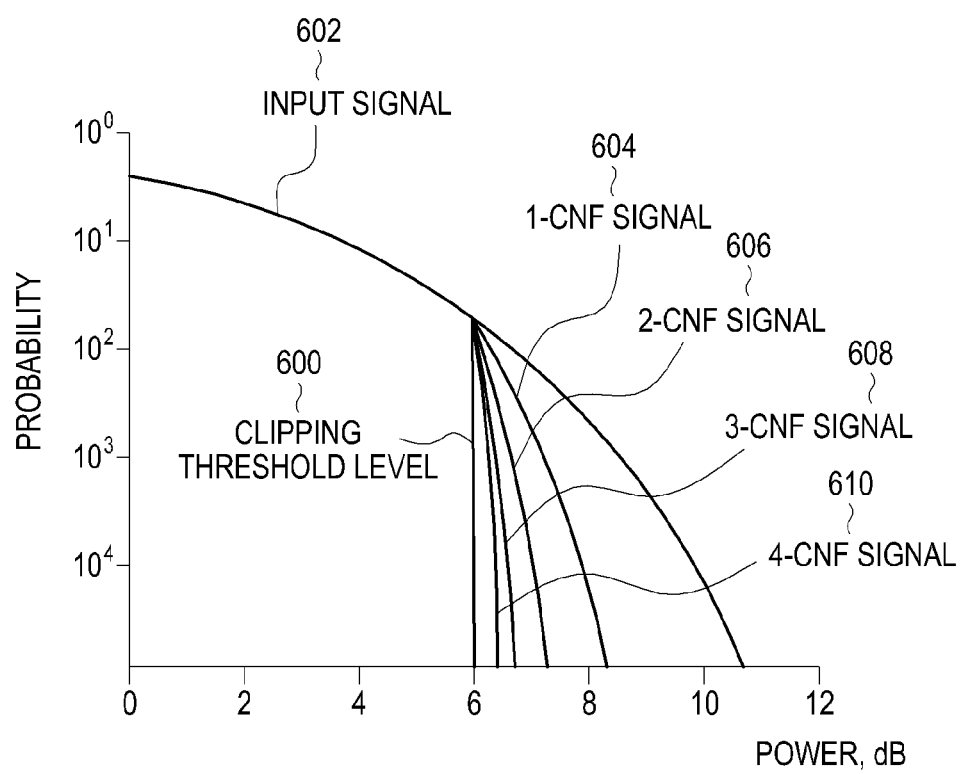
FIG. 6 is a diagram illustrating suppression of peak regrowths caused by filtering in CNF by Repeated Clipping and Filtering (RCF) according to the related art.

FIG. 6 is a diagram illustrating suppression of peak regrowths by RCF according to the related art.

Referring to FIG. 6, an input signal 602 is clipped at a clipping threshold level 600, and signals 604, 606, 608, and 610 having undergone clipping and filtering one to four times gradually approach the clipping threshold level 600 while their shapes remain smooth.

However, in the case of RCF, since the repeated filtering increases an effective filter length to the extent of a multiple of the number of repetitions, the filtering affects a broader sample region, deteriorating an EVM disadvantageously. In addition, the hardware size and processing time may also increase to the extent of the number of repetitions.

Unlike the clipping scheme, a peak windowing scheme refers to a scheme of smoothing a clipping window c(n) and then applying it by multiplication of an input signal x(n), instead of directly multiplying the clipping window c(n) by the input signal x(n).

Figure 7:
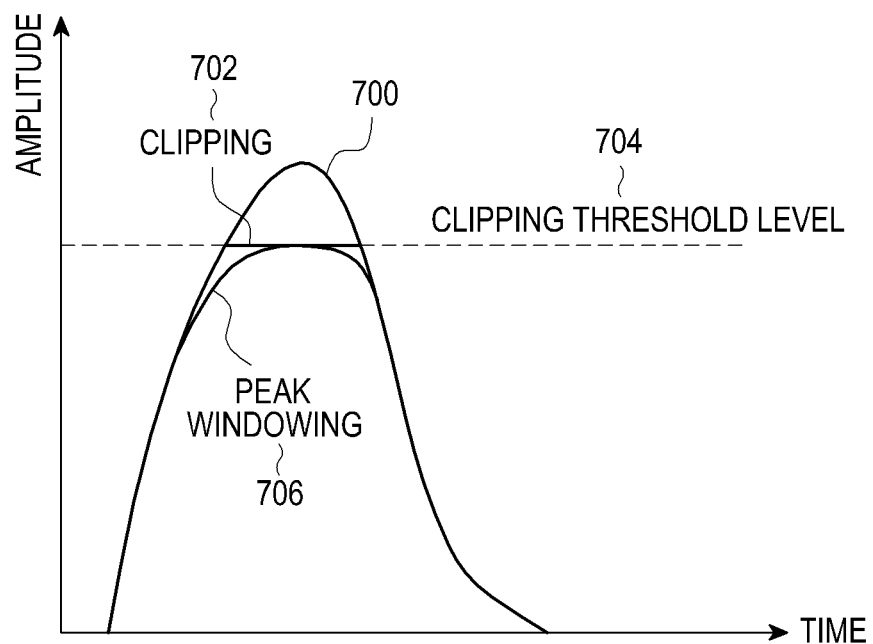
FIG. 7 is a diagram illustrating clipping and peak windowing techniques for reducing a PAPR of an input signal.

FIG. 7 is a diagram illustrating clipping and peak windowing techniques for reducing a PAPR of an input signal according to the related art.

Referring to FIG. 7, an input signal 700 is sharply clipped below a clipping threshold level 704 (see 702). The sharp components causing sudden changes of the clipped signal 702 are shaped to be smooth by peak windowing (see 706).

Figure 8:
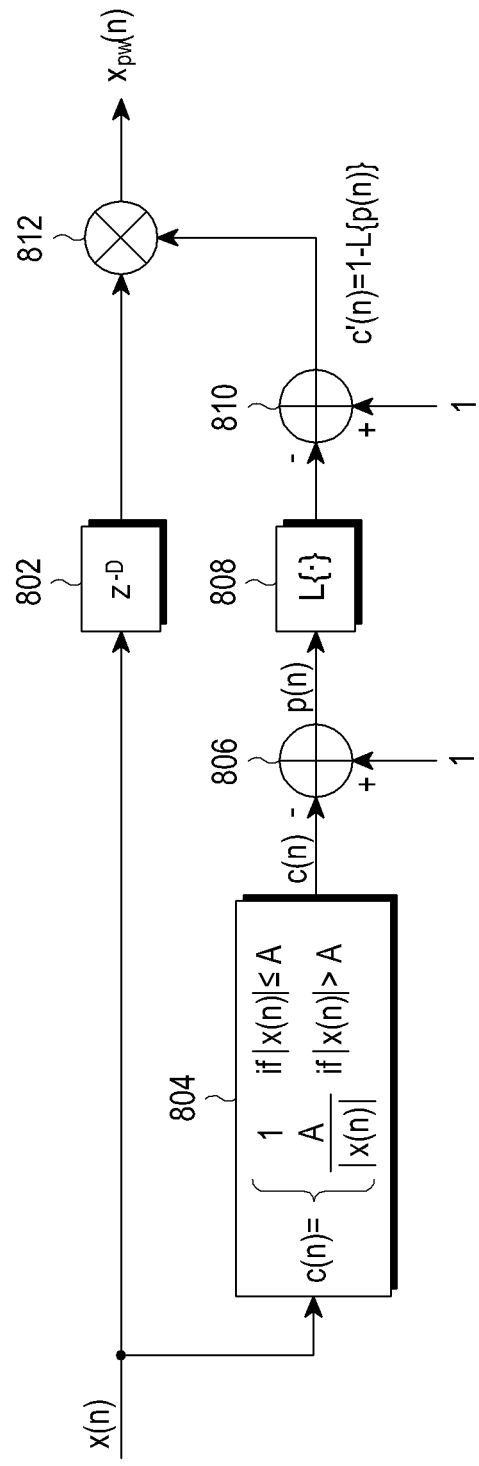
FIG. 8 is a block diagram illustrating a CFR block with clipping and peak windowing according to an exemplary embodiment of the present invention.

FIG. 8 is a block diagram illustrating a CFR block with clipping and peak windowing according to an exemplary embodiment of the present invention.

Referring to FIG. 8, an OFDM-modulated input signal x(n) is input to a delay 802 and an inverse calculator 804. If a signal level of the input signal exceeds a clipping threshold level A, the delay 802 delays the input signal by a path delay D and then delivers the delayed input signal to a multiplier 812 in order to compensate for the path delay D by the inverse calculator 804, subtractors 806 and 810, and a smoothing unit 808. If the signal level of the input signal does not exceed the clipping threshold level A, the multiplier 812 multiplies the input signal received through the delay 802 by '1', and outputs the multiplied input signal, i.e., outputs the input signal without change.

If the signal level of the input signal exceeds the clipping threshold level A, the inverse calculator 804 multiplies the predetermined clipping threshold level A by an inverse of the input signal and outputs a clipping function c(n). If the signal level of the input signal does not exceed the clipping threshold level A, the inverse calculator 804 outputs c(n)=1. The subtractor 806 generates a smoothing input signal p(n) by subtracting the clipped signal c(n) from '1'. The smoothing unit 808 outputs L{p(n)} by performing a smoothing operation on the input p(n), and the subtractor 810 generates a smoothed c(n), i.e., c'(n) represented by Equation (3) below, by subtracting the L{p(n)} from '1'.

$$c'(n)=1-L\{p(n)\} \quad (3)$$

where c'(n) denotes a smoothed clipping function, and L{ } denotes a smoothing function.

Finally, the multiplier 812 generates a peak-windowed signal $x_{p\omega}(n)$ by multiplying the input signal x(n) received through the delay 802 by the output from the subtractor 810.

If p(n)=1−c(n), the peak-windowed signal $x_{p\omega}(n)$ is defined as Equation (4) below.

$$x_{pw}(n)=c'(n)x(n)=(1-L\{p(n)\})x(n) \quad (4)$$

Since L{p(n)} is a smoothed signal, c'(n) is also a smoothed signal. Thus, in a spectrum of c'(n), high-frequency components are reduced. Because multiplying c'(n) in the time domain corresponds to convolutioning a Fast Fourier Transform (FFT) signal in the frequency domain, out-of-band radiation is reduced in the results obtained by convolutioning a signal that does not have high-frequency components.

Figure 9:
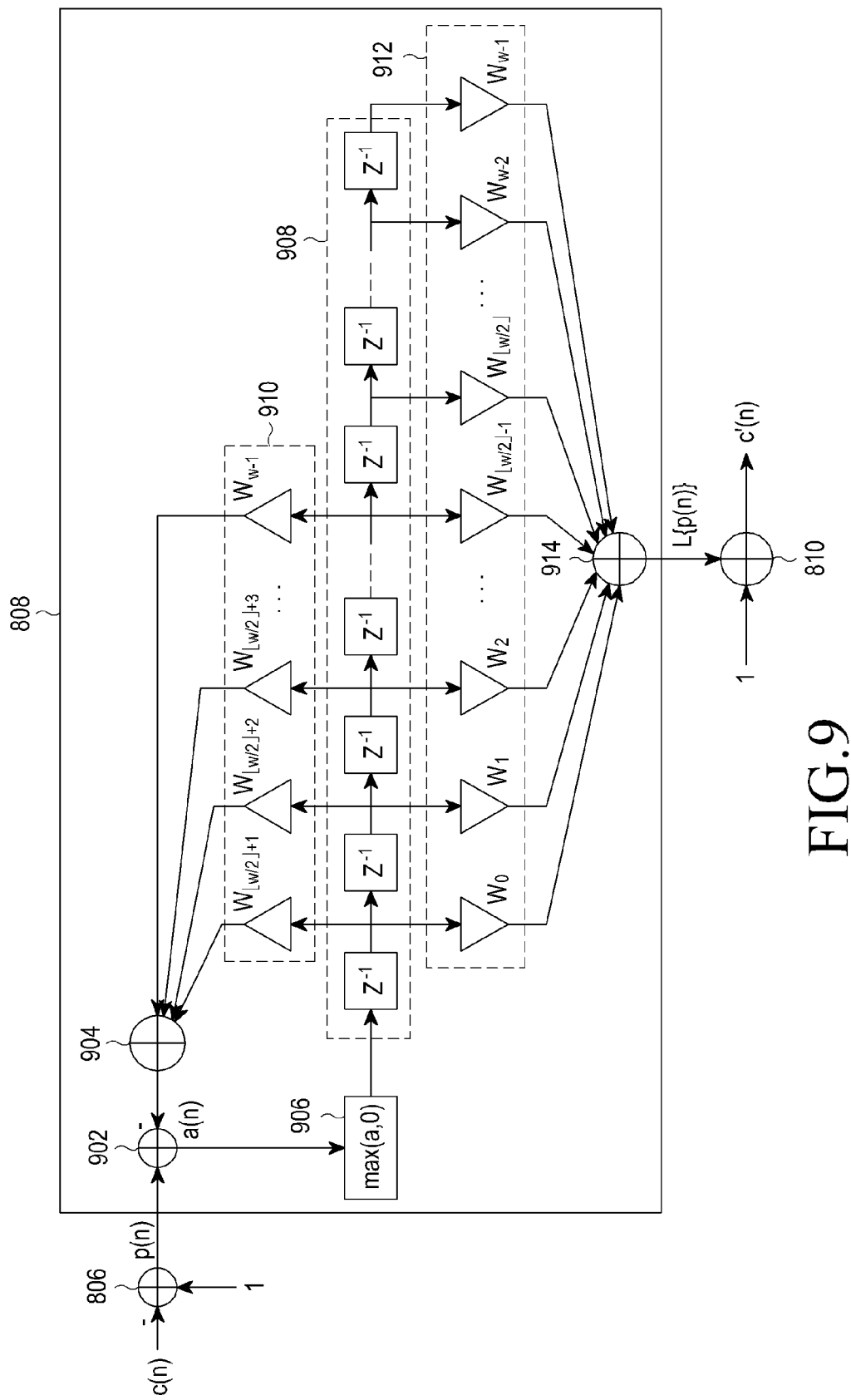
FIG. 9 is a diagram illustrating a structure of a smoothing unit with a feedback structure according to an exemplary embodiment of the present invention.

FIG. 9 is a diagram illustrating a structure of a smoothing unit with a feedback structure according to an exemplary embodiment of the present invention.

Referring to FIG. 9, samples of a signal p(n)=1−c(n), generated by the subtractor 806, are sequentially input to the smoothing unit 808, which is realized with an Finite Impulse Response (FIR) filter with a feedback structure. A subtractor 902 outputs a signal a(n) that is generated by subtracting a signal having been fed back through a feedback path from the input signal p(n). A maximum operator 906 selects one of a(n) and zero (0), whichever is greater, and inputs the selected value to a first stage of a delay unit 908 including cascaded delays. Signals output from output taps of the delays are multiplied by w associated filtering coefficients $W_0$, $W_1$, $W_2$, ..., $W_{\omega-1}$ by a first multiplying unit 912. A first adder 914 generates L{p(n)} or a smoothed p(n) by summing the signals output from the first multiplying unit 912, and the L{p(n)} is provided to the subtractor 810 in FIG. 8. The number of filtering coefficients, i.e., a filter length or the number of filtering taps, is determined through computer simulations to meet the appropriate requirements.

Meanwhile, the signals output from output taps of the delays are multiplied by some $W_{\lfloor w/2 \rfloor+1}$, $W_{\lfloor w/2 \rfloor+2}$, $W_{\lfloor w/2 \rfloor+3}$, ..., $W_{w-1}$ of the filtering coefficients by a second multiplying unit 910, and then provided to a second adder 904. The second adder 904 sums the signals output from the second multiplying unit 910, and feeds back the summed signal to the subtractor 902. The second multiplying unit 910 and the second adder 904 constitute a feedback path in the smoothing unit 808.

The smoothing unit illustrated in FIG. 9 is efficient in hardware structure and satisfactory even in spectrum performance, but it has poor EVM performance and has many restrictions due to the feedback structure.

That is, because as many multiplications (910) as the number corresponding to one half (w/2) of the filtering length occur in the feedback path, and (w/2−1) additions (904) and operations (902 and 906) of subtracting a sum of feedback signals from p(n)=1−c(n) and then selecting the maximum value should be processed for a 1-sample time, an overload may occur. In the case of a signal having a bandwidth of 20 MHz used in the $3^{rd}$ Generation Partnership Project (3GPP) Long Term Evolution (LTE) system, if peak windowing is performed after double oversampling, calculation of the feedback path should be completely processed within 1/61.44 MHz=16.27 nanoseconds (ns). Therefore, when the smoothing unit is made with a Field Programmable Gate Array (FPGA) or an Application Specific Integrated Circuit (ASIC), bottlenecks may occur that make it difficult to process signals having a large bandwidth and a high data rate in time. To address this problem, over-clocking may be used, but the use of over-clocking may increase power consumption undesirably. Alternatively, calculation of the feedback path may be processed previously on an offline basis wherein the calculation results are stored in a buffer for later use. However, this method is unsuitable for hardware realization, since it requires a large memory capacity for buffering.

Another problem is the poor EVM performance. More particularly, if a CR is low, i.e., if significant clipping occurs due to a low clipping threshold level A, (1−L{p(n)})<<c(n) in the feedback structure of FIG. 8 and thus overcompensation takes place, significantly reducing the input signal. The significant reduction in input signal augments in-band distortion, which makes the EVM large, resulting in a reduction in Signal-to-Noise Ratio (SNR) and affecting Bit Error Rate (BER) performance.

Figure 10:
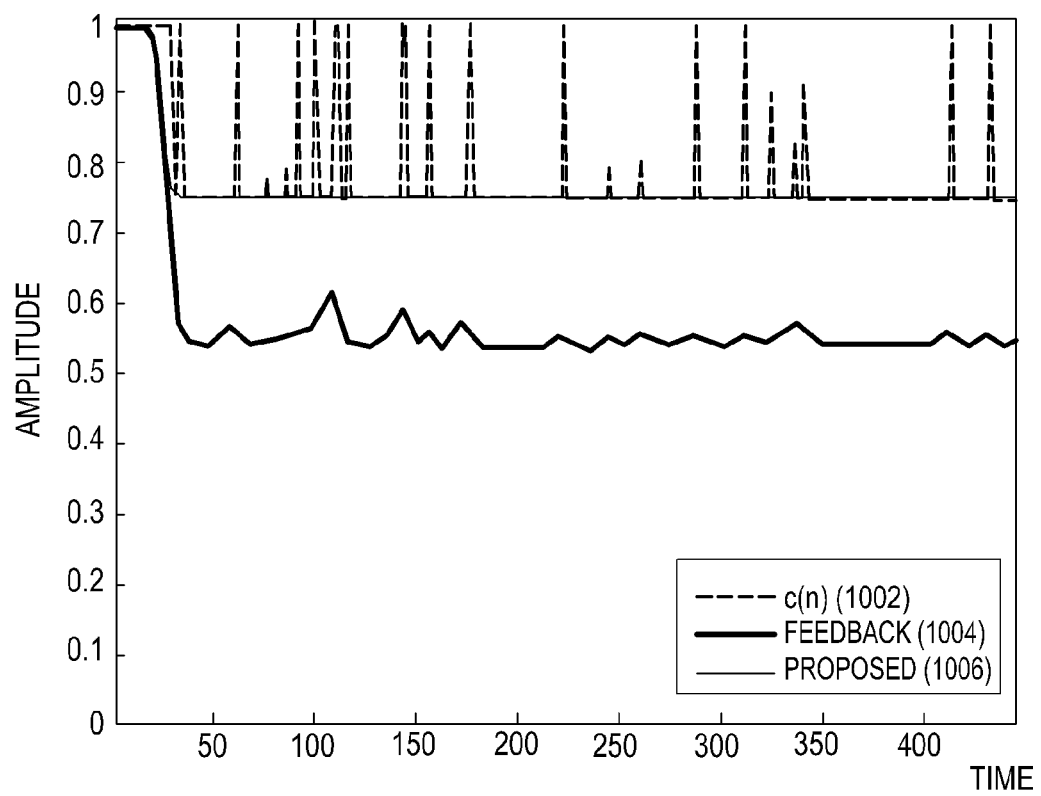
FIG. 10 is a diagram illustrating Error Vector Magnitude (EVM) performance of peak windowing with a feedback structure according to an exemplary embodiment of the present invention.

FIG. 10 is a diagram illustrating EVM performance of peak windowing with a feedback structure according to an exemplary embodiment of the present invention.

Figure 11:
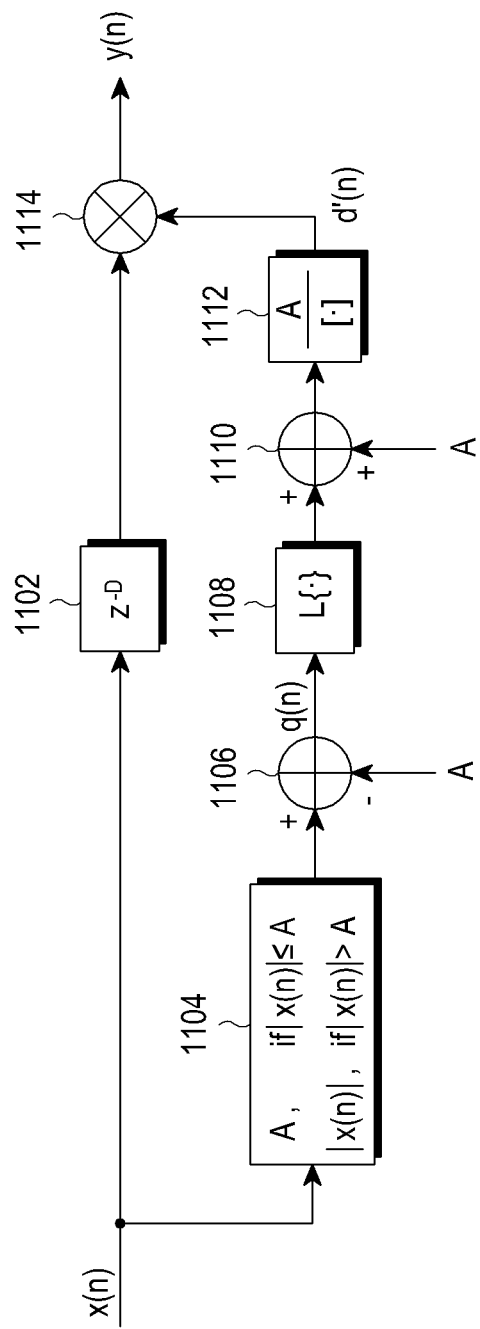
FIG. 11 is a block diagram illustrating an alternative CFR block with clipping and peak windowing according to an exemplary embodiment of the present invention.
Figure 12:
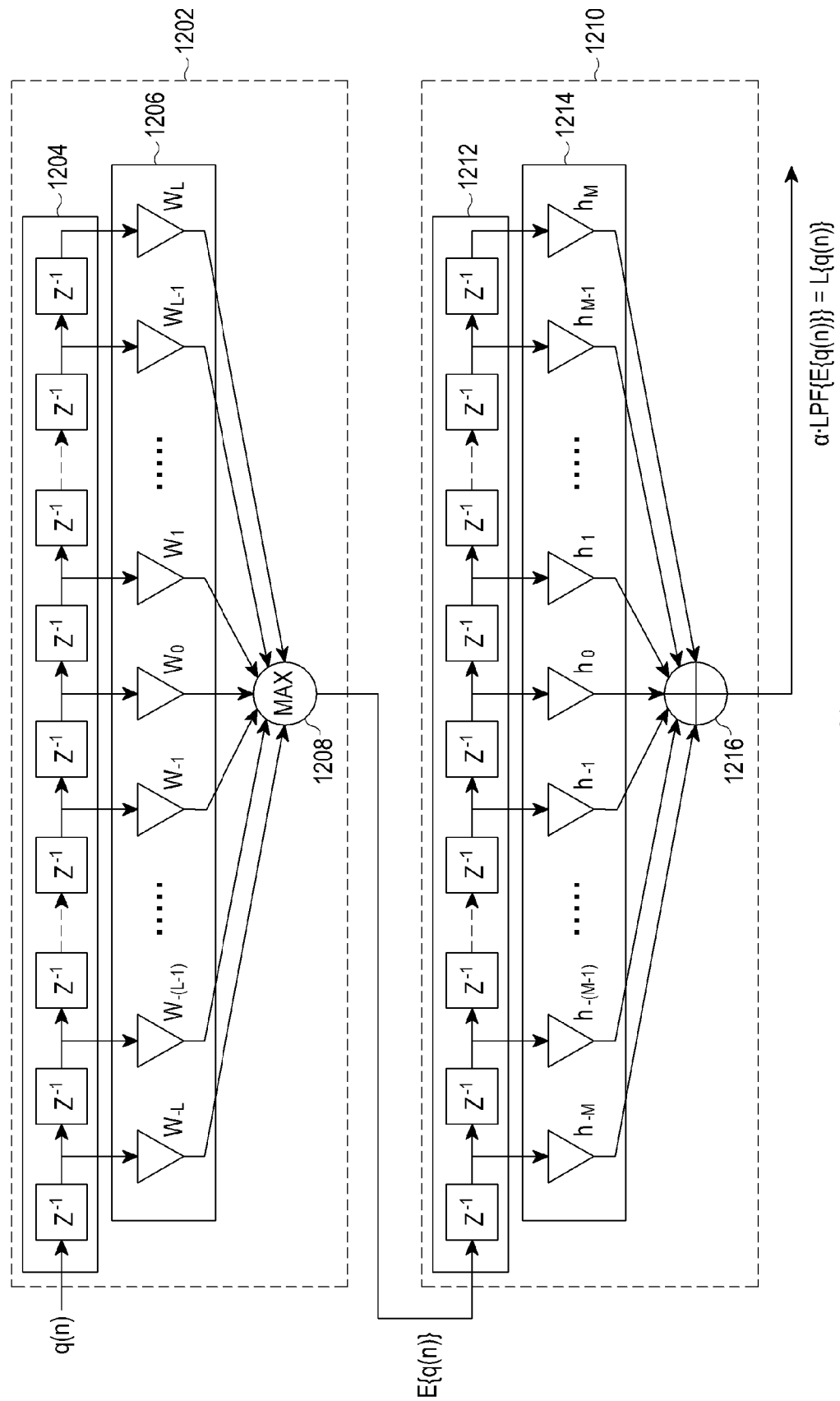
FIG. 12 is a diagram illustrating a structure of an envelope detector and envelope smoothing unit with Smoothed Windowed Envelope Detection (SWED) according to an exemplary embodiment of the present invention.

Referring to FIG. 10, proximity to a clipping function c(n) 1002 indicates better EVM performance, and a signal 1004 having undergone clipping and filtering according to the feedback structure of FIG. 8 deteriorates in EVM about two times. On the other hand, a signal after undergoing peak windowing according to the below-described structures of FIGS. 11 and 12 or FIGS. 8 and 12 is relatively low in EVM performance degradation. (c.f. FIG. 12 has more impact on EVM performance than FIG. 8 or FIG. 11.)

FIG. 11 is a block diagram illustrating a CFR block with clipping and peak windowing according to an exemplary embodiment of the present invention.

Referring to FIG. 11, an input signal x(n) including a modulated data symbol stream generated according to a wireless access technology, such as OFDM, Single Carrier-Frequency Division Multiple Access (SC-FDMA) and Wideband Code Division Multiple Access (WCDMA), is input to a delay 1102 and an absolute value calculator 1104. To compensate for a path delay D by the absolute value calculator 1104, a subtractor 1106, a smoothing unit 1108, an adder 1110, and an inverse calculator 1112, the delay 1102 delivers the input signal x(n), after delay by D, to a multiplier 1114.

If a signal level of the input signal x(n) exceeds a clipping threshold level A, the absolute value calculator 1104 calculates an absolute value |x(n)| of the input signal. Unlike the exemplary embodiment illustrated in FIG. 8, the intact input signal x(n) rather than an inverse thereof undergoes smoothing. If the signal level of the input signal x(n) does not exceed the clipping threshold level A, the absolute value calculator 1104 outputs the clipping threshold level A. The subtractor 1106 generates a smoothing input signal q(n) by subtracting the clipping threshold level A from the output of the absolute value calculator 1104. The smoothing input signal q(n) is defined as Equation (5) below.

$$q(n) = \begin{cases} 0 & \text{if } |x(n)| \leq A \\ |x(n)| - A & \text{if } |x(n)| > A \end{cases} \quad (5)$$

The smoothing unit 1108 outputs L{q(n)} by performing a smoothing operation on the input q(n), and the adder 1110 adds A to the output of the smoothing unit 1108. The inverse calculator 1112 generates a smoothed clipping function d'(n) expressed as Equation (6) below, by calculating an inverse of the output of the adder 1110.

$$d'(n) = \frac{A}{A + L\{q(n)\}} \quad (6)$$

Finally, the multiplier 1114 generates a peak-windowed signal y(n) by multiplying the input signal x(n) received through the delay 1102 by the output from the inverse calculator 1112.

Comparing the structure of FIG. 11 with the structure of FIG. 8, an inverse A/|x(n)| of the input signal is handled in FIG. 8, whereas the original input signal is handled intact in FIG. 11. That is, q(n) is the same as the above-mentioned Equation (5).

The smoothing input signal q(n) denotes a clipped envelope signal, and always satisfies q(n)>=0. The finally peak-windowed signal y(n) is defined as Equation (7) below.

$$y(n) = \begin{cases} x(n) & \text{if } |x(n)| \leq A \\ \frac{A}{A + L\{q(n)\}} x(n) & \text{if } |x(n)| > A \end{cases} \quad (7)$$

The smoothing unit 1108 may be made with an FIR filter having the feedback structure described above in connection with FIG. 9, may be made according to other known methods, or may be made according to the below-described embodiment of the present invention.

FIG. 12 is a diagram illustrating a structure of a smoothing unit with Smoothed Windowed Envelope Detection (SWED) according to an exemplary embodiment of the present invention.

Referring to FIG. 12, the smoothing unit includes a Windowed Envelope Detector (WED) 1202 and an amplifying Low-Pass Filter (LPF) 1210. It should be noted that the illustrated smoothing unit may be applied not only to the CFR block in FIG. 11, but also to the CFR block with an FIR filter structure including the feedback structure of FIG. 8, and to the conventional peak windowing block made in another method.

As illustrated in FIG. 12, samples of a smoothing input signal q(n)=|x(n)|−A generated by the subtractor 1106, or samples of a smoothing input signal p(n)=A/|x(n)| generated by the subtractor 806 in FIG. 9, are sequentially shifted by cascaded delays constituting a delay unit 1204. Signals output from output taps of the delays are multiplied by (2L+1) associated window coefficients $W_{-L}, W_{-(L-1)}, \ldots, W_{L-1}, W_L$ by a first multiplying unit 1206. A maximum operator 1208 generates a windowed envelope signal E{q(n)} by selecting maximum values at every sampling time from the signals to which the window coefficients are applied. To be specific, the windowed envelope signal E{q(n)} is defined as Equation (8) below.

$$E\{q(n)\} \equiv \max_{-L \leq k \leq L}\{W_k \cdot q(n-k)\} = \max\begin{Bmatrix} W_{-L}q(n+L), \\ \ldots, \\ W_{-1}q(n+1), \\ W_0 q(n) \\ W_1 q(n-1), \\ \ldots, \\ W_L q(n-L), \end{Bmatrix} \quad (8)$$

Since the maximum operator 1208 selects only greater values, the number of multiplications may be halved in actual realization thereof by using Equation (9) below. The maximum operator enables more efficient hardware realization since it is lower in complexity than adders. In addition, constant multiplication may be simply implemented by only adders and shifters.

$$E\{q(n)\} = \max\begin{Bmatrix} W_0 q(n) \\ W_1 \max\{q(n-1), q(n+1)\} \\ W_2 \max\{q(n-2), q(n+2)\} \\ \ldots, \\ W_L \max\{q(n-L), q(n+L)\} \end{Bmatrix} \quad (9)$$

Since q(n) is greater than or equal to 0, and less than 1, and Wk is greater than or equal to 0, and less than or equal to 1, E{q(n)}<1.

In the case where the above WED 1202 is applied to the smoothing unit 1108, when a cluster of peaks occurs in an input signal, two windows corresponding to the peaks may overlap, generating a portion where a signal's slope is suddenly changed in the middle thereof. The amplifying LPF 1210 is used to smooth the above portion.

Samples of the windowed envelope signal E{q(n)} are sequentially shifted and input to cascaded delays constituting a delay unit 1212 in the amplifying LPF 1210. Signals output from output taps of the delays are multiplied by (2M+1) associated LPF coefficients $h_{-M}, h_{-(M-1)}, \ldots, h_{(M-1)}, h_M$ by a second multiplying unit 1214. A adder 1216 calculates a smoothed signal L{q(n)} by summing the signals output from the second multiplying unit 1214. The smoothed signal L{q(n)} is defined as Equation (10) below.

$$L\{q(n)\} = \alpha \cdot LPF\{E\{q(n)\}\} \quad (10)$$

$$\sum_k |h_k| = \alpha \geq 1$$

where α denotes a scaling factor, and LPF{ } denotes an LPF function.

When the normal LPF is applied, L{q(n)}>=q(n) is not always satisfied, thereby possibly causing peak regrowths. The scaling factor α, used to prevent the peak regrowths, is set to always meet L{q(n)}>=q(n). In other words, to compensate for the amplitude reduction by the WED 1202, it is preferable for the above LPF coefficients $h_k$ to be determined such that a sum (i.e., scaling factor) of them is greater than or equal to 1. In order to determine the LPF coefficients, a known filtering coefficient calculation scheme, for example, one of Hanning, Hamming, Kaiser, and Binomial schemes may be used.

As an example, it is assumed that signals clipped at, for example, certain sampling times n and n+1 show two consecutive peaks x(n)=9A and x(n+1)=8A. In the structures of FIGS. 8 and 9, because c(n)=A/9A=1/9 and c(n+1)=A/8A=1/8, p(n)=1−c(n)=8/9 and p(n+1)=1−c(n+1)=7/8. Assuming that all coefficients W for smoothing are 1, in the structure of FIG. 9, since values multiplied by the coefficients are linearly added, L{p(n)}=8/9+7/8=127/72>1. That is, because (1−L{p(n)})<0, (1−L{p(n)})x(n) is not a desired signal, but an inverted signal, causing significant deterioration of the EVM.

A description will be made of an example in which the same inputs are used in the structures of FIGS. 11 and 12. q(n)=8A and q(n+1)=7A, and thus L{q(n)}=15A. As a result, because (A/(A+L{q(n)}))=1/16, (A/(A+L{q(n)}))*x(n)=9A/16<A. That is, even in the abnormal worst case where all coefficients for smoothing are 1, peak windowing is applied without abnormal operations, contributing to a reduction in PAPR.

Figure 13:
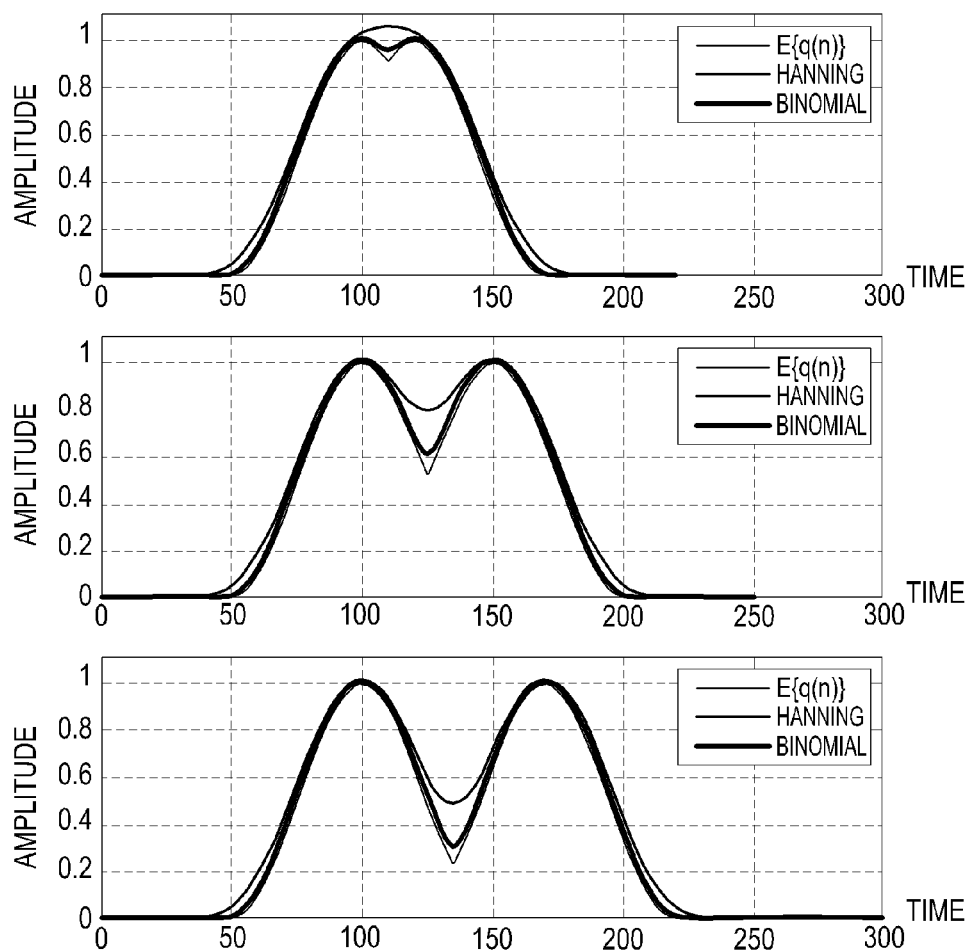
FIG. 13 is a diagram illustrating smoothing by Low Pass Filtering (LPF) according to an exemplary embodiment of the present invention.

FIG. 13 is a diagram illustrating smoothing by LPF according to an exemplary embodiment of the present invention.

Referring to FIG. 13, LPF smoothing results, obtained by applying a windowed envelope signal E{q(n)} and LPF coefficients calculated by Hanning and Binomial schemes, are illustrated in comparison. It can be understood that as illustrated, the portion where a signal's slope is suddenly changed in E{q(n)}, is smoothed by LPF filtering.

Figure 14:
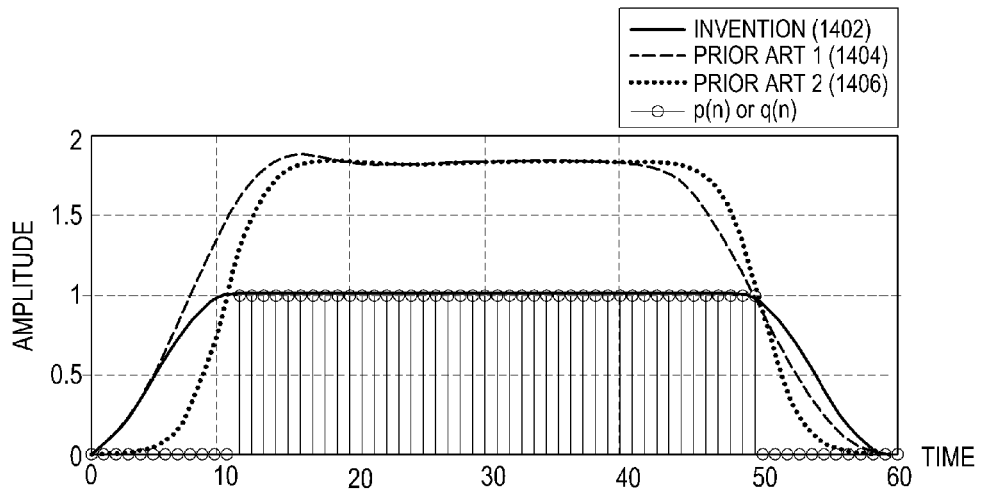
FIGS. 14 and 15 are diagrams illustrating comparison of worst case filtering performance and EVM performance by peak windowing structures according to exemplary embodiments of the present invention.
Figure 15:
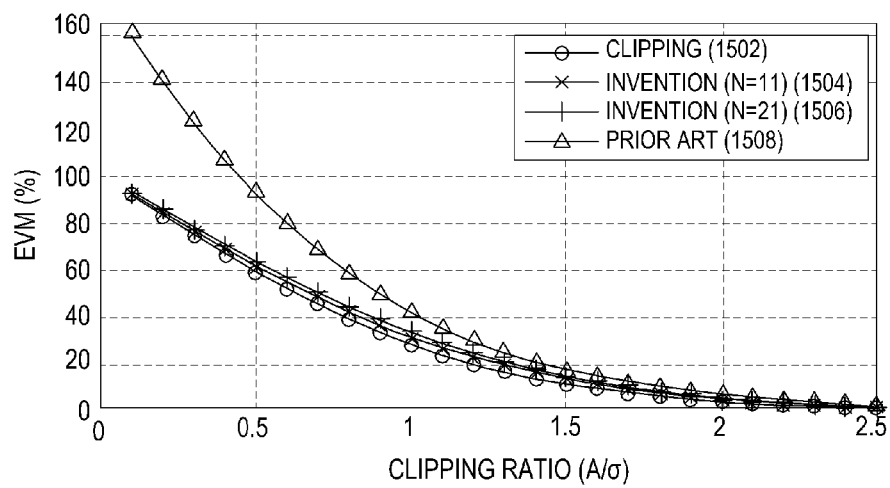

FIGS. 14 and 15 are diagrams illustrating filtering performance and EVM performance by peak windowing structures according to exemplary embodiments of the present invention.

Referring to FIG. 14, it can be noted that the smoothing results 1402 achieved by peak windowing structures such as those illustrated in FIGS. 11 and 12 relatively correctly follow the envelope of a smoothing input signal p(n) or q(n), compared with those of the prior arts 1404 and 1406 using an FIR filter having the feedback structure.

Referring to FIG. 15, the smoothing results 1504 and 1506 achieved by peak windowing structures such as those illustrated in FIGS. 11 and 12 approach a clipped signal 1502 more closely, compared with those of the prior art 1508 using an FIR filter having the feedback structure. That is, it can be understood that in the prior arts 1404 and 1406, overshooting occurs, deteriorating the EVM. Curves 1504 and 1506 represent EVM performances when the number N of coefficients for windowing and LPF in FIG. 12 is 11 and 21, respectively.

In conclusion, when satisfying the same PAPR bound, the structures illustrated in FIGS. 11 and 12 achieve better performance in terms of EVM, out-of-band radiation, and in-band distortion.

As is apparent from the foregoing description, to reduce a PAPR of an input signal to be power-amplified, exemplary embodiments of the present invention apply peak windowing with no feedback structure, thereby addressing the overcompensation problem while processing signals having a large bandwidth and high data rate without delay. By doing so, exemplary embodiments of the present invention reduce in-band distortion and out-of-band radiation caused by clipping, thereby minimizing the influence on the BER and Adjacent Channel Leakage Ratio (ACLR) performances.

In addition, exemplary embodiments of the present invention are suitable for on-the-fly implementation and do not require buffering or over-clocking, because of no restrictions on timing margins associated with signal bandwidths, making it possible to reduce the hardware memory size and power consumption. Moreover, since no peak regrowths occur, exemplary embodiments of the present invention can prevent hardware waste and time delay for repetition, which may occur in repeated clipping and filtering, thereby obtaining better performances in terms of out-of-band radiation, compared with the conventional feedback structure.

While the invention has been shown and described with reference to certain exemplary embodiments thereof, it will be understood by those skilled in the art that various changes in form and details may be made therein without departing from the spirit and scope of the invention as defined by the appended claims and their equivalents. For instance, the present invention can be utilized as bandwidth reduction method of an envelope.

What is claimed is:

1. A method for reducing a Peak to Average Power Ratio (PAPR) using peak windowing, the method comprising;
   calculating an absolute value of an input signal;
   subtracting a predetermined clipping threshold level from the absolute value;
   outputting a first smoothed signal by performing smoothing on the subtracted signal according to a predetermined smoothing scheme;
   adding the first smoothed signal to the predetermined clipping threshold level;
   outputting a second smoothed signal by multiplying the predetermined clipping threshold level by an inverse of the added signal; and
   outputting a final PAPR-reduced signal by multiplying the input signal by the second smoothed signal.

2. The method of claim 1, wherein the outputting of the second smoothed signal comprises using the following equation:

$$d'(n) = \frac{A}{A + L\{q(n)\}}$$

wherein d'(n) denotes the second smoothed signal, A denotes the predetermined clipping threshold level, and L{q(n)} denotes the first smoothed signal.

3. The method of claim 1, wherein the performing of the smoothing comprises:
   multiplying samples constituting the subtracted signal by window coefficients individually;
   generating a windowed envelope signal by selecting maximum values at every sampling time from the signals multiplied by the window coefficients; and
   performing Low-Pass Filtering (LPF) on the windowed envelope signal.

4. The method of claim 3, wherein the performing of the LPF comprises:
   multiplying samples constituting the windowed envelope signal by LPF coefficients individually; and
   summing the signals multiplied by the LPF coefficients.

5. The method of claim 4, wherein the LPF coefficients are determined such that a sum of the LPF coefficients is greater than or equal to 1.

6. An apparatus for reducing a Peak to Average Power Ratio (PAPR) using peak windowing, the apparatus comprising;
   an absolute value calculator for calculating an absolute value of an input signal;
   a subtractor for subtracting a predetermined clipping threshold level from the absolute value;
   a smoothing unit for smoothing the subtracted signal according to a predetermined smoothing scheme and for outputting a first smoothed signal;
   an adder for adding the first smoothed signal to the predetermined clipping threshold level;

an inverse calculator for outputting a second smoothed signal by multiplying the predetermined clipping threshold level by an inverse of the added signal; and a multiplier for outputting a final PAPR-reduced signal by multiplying the input signal by the second smoothed signal.

7. The apparatus of claim 6, wherein the second smoothed signal output by the inverse calculator is defined by the following equation:

$$d'(n) = \frac{A}{A + L\{q(n)\}}$$

wherein d'(n) denotes the second smoothed signal, A denotes the predetermined clipping threshold level, and L{q(n)} denotes the first smoothed signal.

8. The apparatus of claim 6, wherein the smoothing unit comprises:

a plurality of cascaded delays for receiving samples constituting the subtracted signal;

multipliers for multiplying outputs of the delays by window coefficients individually;

a maximum operator for generating a windowed envelope signal by selecting maximum values at every sampling time from the signals multiplied by the window coefficients; and an amplifying low-pass filter for performing Low-Pass Filtering (LPF) and amplification on the windowed envelope signal.

9. The apparatus of claim 8, wherein the amplifying low-pass filter comprises:

a plurality of cascaded delays for receiving samples constituting the windowed envelope signal;

multipliers for multiplying outputs of the delays by LPF coefficients individually; and a adder for summing the signals multiplied by the LPF coefficients.

10. The apparatus of claim 9, wherein the LPF coefficients are determined such that a sum of the LPF coefficients is greater than or equal to 1.

* * * * *